T. SANDBACH & J. W. FOWLER.
TOOL FOR PUTTING DOWN TUBE WELLS.

No. 101,925. Patented Apr. 12, 1870.

Inventors.
Thomas Sandbach
Joseph W. Fowler
per Brownlcombs &

Witnesses:
Attorneys

UNITED STATES PATENT OFFICE.

THOMAS SANDBACH AND JOSEPH W. FOWLER, OF SOUTH BEND, INDIANA.

IMPROVED WELL-BORER.

Specification forming part of Letters Patent No. 101,925, dated April 12, 1870.

*To all whom it may concern:*

Be it known that we, THOMAS SANDBACH and JOSEPH WILLIAM FOWLER, both of South Bend, in the county of St. Joseph and State of Indiana, have invented a new and useful Improvement in Tools for Putting Down Tube-Wells, of which the following is a full, clear, and exact description, reference being had to the accompanying drawings, forming part of this specification, and in which—

Figure 1:
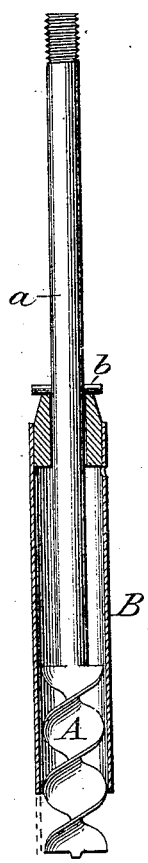
Figure 2:
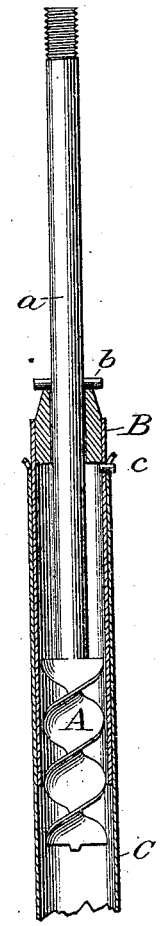

Figure 1 represents a vertical section of the tool or tools, in part, as used in the first stage of forming the shaft for reception of the well-tube; and Fig. 2, a similar view of the same, in connection with an outer or additional tube for completing said shaft.

Similar letters of reference indicate corresponding parts.

This invention relates to putting down tube-wells by a process of boring, as distinguished from driving; and it consists in a combination of an auger with a surrounding tube or sleeve open at its bottom, and within which the auger turns freely, and with an outer surrounding tube designed to be applied in connection with the same, for finishing the shaft, substantially as hereinafter described.

Referring to the accompanying drawings, A is an auger made capable of free rotation within a metal tube, B, open at its lower end, and through which the auger in boring projects, carrying down with it the tube B by means of a cross-pin, $b$, inserted through the auger or its shank $a$, and brought to bear or press upon the upper closed end of the tube, through which the auger-shank $a$ projects, and may be connected, by a screw or other coupling, at its upper end, to any required extent or length. Any suitable power may be used to rotate the auger that, in connection with the tube B, serves to hold and take up the earth from any required depth to reach water, the same being raised and cleared as often as necessary. After water has been reached and the tube B raised from the well, a sheet-metal additional tube, C, of a length corresponding, or thereabout, to the depth of the well, and that may be made up of successive sections, is slid onto the tube B, and held in place and borne or carried down with the auger and its tube B by means of a pin, $c$, fitted to the latter near its top, until said outer tube, C, is forced its whole length, or thereabout, through the earth and water, after which the pin $b$ is removed from the auger and the latter projected and rotated to bore out the earth in the tube C, said earth being extracted in or by the ascent of the auger and removal of the same, with its tube B, leaving the tube C in the shaft. Quicksand and water being thus passed through and a temporarily-lined shaft, as it were, established, the ordinary or any suitable well tube or pipe and screen are then slipped down the tube C, which latter is afterward withdrawn from around and over said well-tube by means of lugs or ears formed on its upper end, leaving the well-tube and its screen standing in proper relation to the water.

What is here claimed, and desired to be secured by Letters Patent, is—

The combination of the auger A with the tube B and additional or outer tube, C, geared or connected and disconnected, when required for operation, in relation to each other, substantially as and for the purpose specified.

THOMAS SANDBACH.
JOSEPH W. FOWLER.

Witnesses:
A. S. DUNBAR,
CHAS. M. TUTT.